(12) United States Patent
Miyawaki et al.

(10) Patent No.: US 9,786,960 B2
(45) Date of Patent: Oct. 10, 2017

(54) ELECTRIC STORAGE APPARATUS

(71) Applicant: GS Yuasa International Ltd., Kyoto-shi (JP)

(72) Inventors: Yasutaka Miyawaki, Kyoto (JP); Hiroshi Yamashiro, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 524 days.

(21) Appl. No.: 14/206,982

(22) Filed: Mar. 12, 2014

(65) Prior Publication Data

US 2014/0287286 A1    Sep. 25, 2014

(30) Foreign Application Priority Data

Mar. 19, 2013   (JP) ................. 2013-056837

(51) Int. Cl.
| | |
|---|---|
| *H01M 2/10* | (2006.01) |
| *H01M 10/48* | (2006.01) |
| *H01M 10/42* | (2006.01) |
| *H01M 10/0525* | (2010.01) |
| *H01M 2/20* | (2006.01) |

(52) U.S. Cl.
CPC ....... *H01M 10/482* (2013.01); *H01M 2/1077* (2013.01); *H01M 10/425* (2013.01); *H01M 2/206* (2013.01); *H01M 10/0525* (2013.01)

(58) Field of Classification Search
CPC ...................................................... H01M 2/10
See application file for complete search history.

(56) References Cited

U.S. PATENT DOCUMENTS

| | | | | |
|---|---|---|---|---|
| 5,569,557 | A | * | 10/1996 | Wagner ............... H01M 2/1077 429/100 |
| 6,146,778 | A | | 11/2000 | Rouillard et al. |
| 6,641,942 | B1 | | 11/2003 | Rouillard et al. |
| 6,797,018 | B2 | | 9/2004 | Rouillard et al. |
| 2003/0213121 | A1 | | 11/2003 | Rouillard et al. |
| 2012/0064379 | A1 | * | 3/2012 | Oguri .................. H01M 2/1016 429/56 |
| 2014/0023893 | A1 | | 1/2014 | Shimizu et al. |

FOREIGN PATENT DOCUMENTS

| | | |
|---|---|---|
| EP | 2 256 900 A1 | 12/2010 |
| EP | 2 782 163 A1 | 9/2014 |
| EP | 2 790 246 A1 | 10/2014 |

(Continued)

OTHER PUBLICATIONS

WO 2013/031614 MT.*

(Continued)

*Primary Examiner* — Alex Usyatinsky
(74) *Attorney, Agent, or Firm* — McGinn IP Law Group, PLLC

(57) ABSTRACT

An electric storage apparatus includes a plurality of electric storage devices aligned in a first direction and each having an electrode terminal extending in a direction orthogonal to the first direction; a holding member configured to hold the plurality of electric storage devices; and a circuit case housing a circuit thereinside, wherein the holding member has an opening, and the circuit case is formed into a size corresponding to the opening so as to close the opening.

17 Claims, 9 Drawing Sheets

(56) References Cited

FOREIGN PATENT DOCUMENTS

| | | |
|---|---|---|
| EP | 2 790 247 A1 | 10/2014 |
| JP | 2001-511586 A | 8/2001 |
| JP | 2012-059663 A | 3/2012 |
| JP | 2012-64356 A | 3/2012 |
| JP | 2012-113961 A | 6/2012 |
| JP | 2013-025983 A | 2/2013 |
| JP | 2013-171746 A | 9/2013 |
| WO | WO 2012/164982 A1 | 12/2012 |
| WO | WO 2013/031614 A1 | 3/2013 |

OTHER PUBLICATIONS

The Decision to grant a Patent issued by JPO on Dec. 21, 2016 for Application No. 2013-056837 (now JP 6086315).*
European Search Report dated Jul. 7, 2014.
Communication pursuant to Article 94(3) EPC dated Apr. 22, 2016.

* cited by examiner

ELECTRIC STORAGE APPARATUS

CROSS-REFERENCE TO RELATED APPLICATION

This application claims priority to Japanese Patent Application No. 2013-056837, the disclosure of which is incorporated herein by reference in its entirety.

FIELD

The present invention relates to an electric storage apparatus including electric storage devices such as battery cells (single cell) and a capacitor, and a circuit such as a monitoring circuit that individually monitors the electric storage devices.

BACKGROUND

As an example of this type, an electric storage apparatus including a plurality of electric storage devices aligned in a first direction, a frame holding the plurality of electric storage devices, and a monitoring circuit module arranged on one side in the first direction of the plurality of electric storage devices is known (JP 2012-64356 A).

Meanwhile, such electric storage apparatuses need to be arranged as closely as possible in a limited space, while eliminating wasted space as much as possible, in order to enhance their electric storage capacity per unit volume. From such a viewpoint, the electric storage apparatus disclosed in JP 2012-64356 A suffers from a problem that, when such electric storage apparatuses are transversely aligned, their electric storage capacity per unit volume is reduced due to there being monitoring circuit modules that have no electric storage capability.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage apparatus capable of enhancing the space efficiency by being arranged as closely as possible.

An electric storage apparatus according to the present invention includes: a plurality of electric storage devices aligned in a first direction and each having an electrode terminal extending in a direction orthogonal to the first direction; a holding member configured to hold the plurality of electric storage devices; and a circuit case housing a circuit thereinside, wherein the holding member has an opening, and the circuit case is formed into a size corresponding to the opening so as to close the opening.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
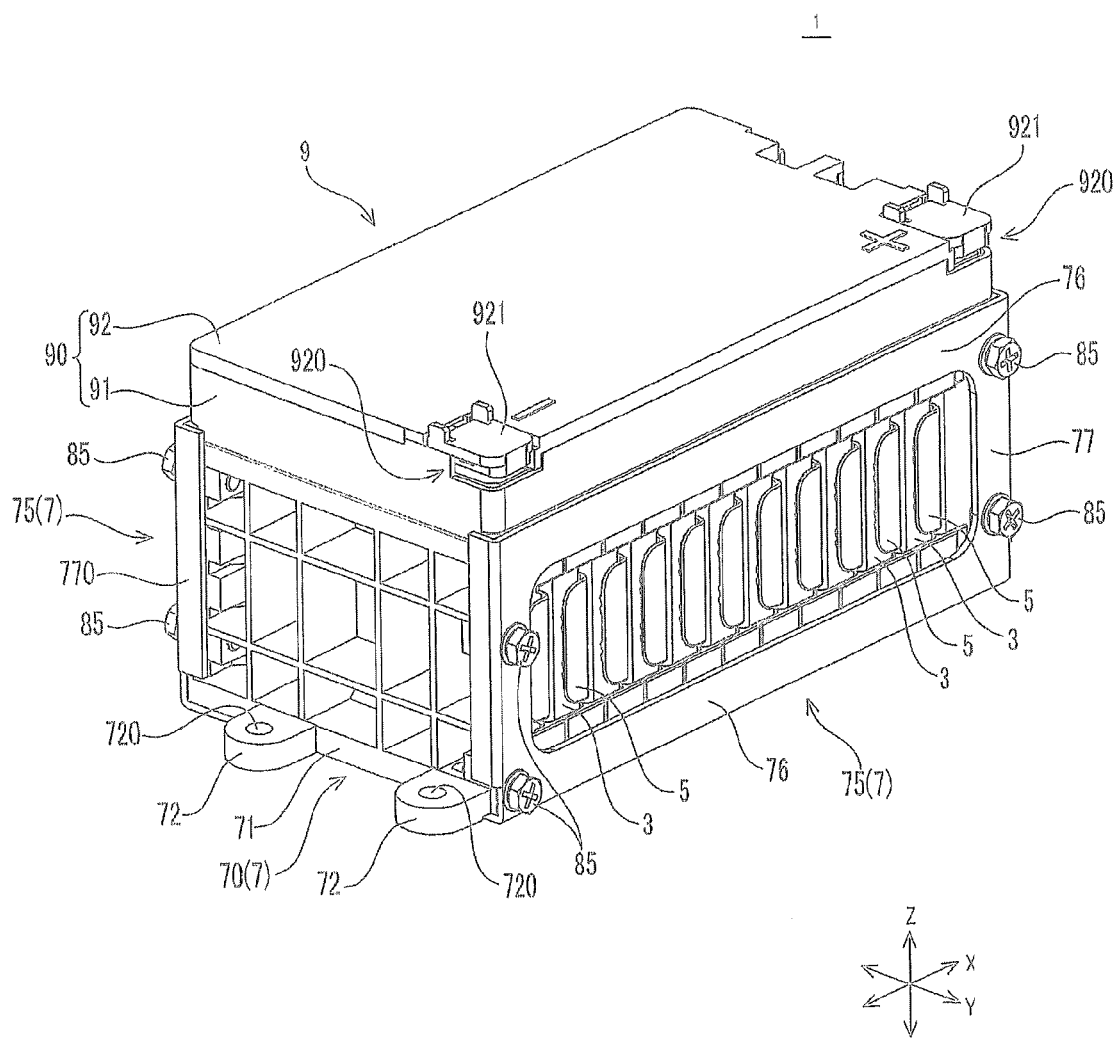
FIG. 1 is a perspective view of a battery module as one embodiment of an electric storage apparatus according to the present invention.
Figure 2:
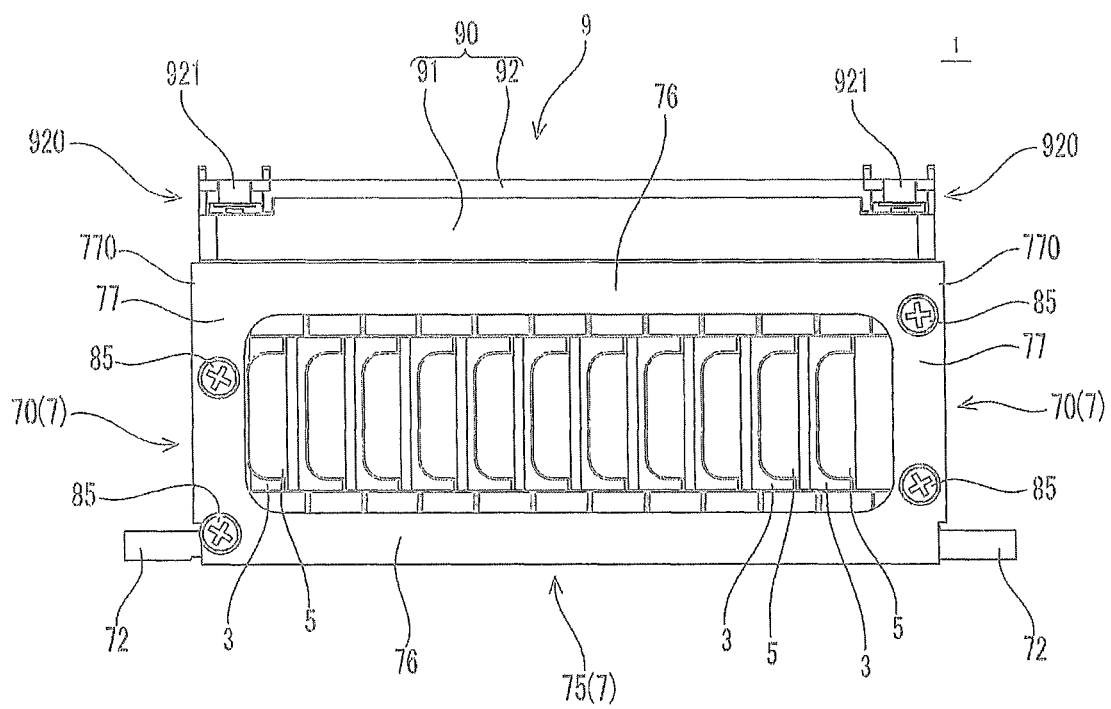
FIG. 2 is a front view of the battery module.
Figure 3:
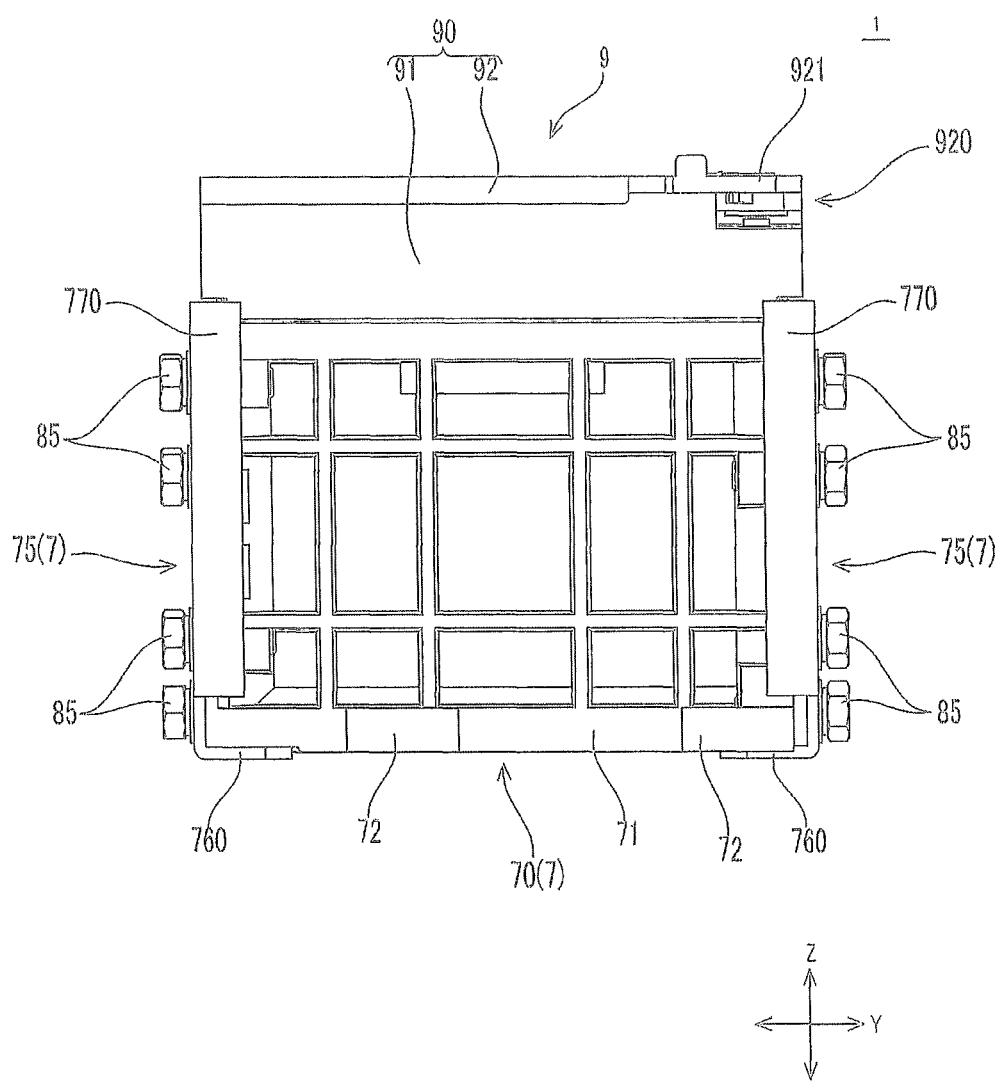
FIG. 3 is a side view of the battery module.
Figure 4:
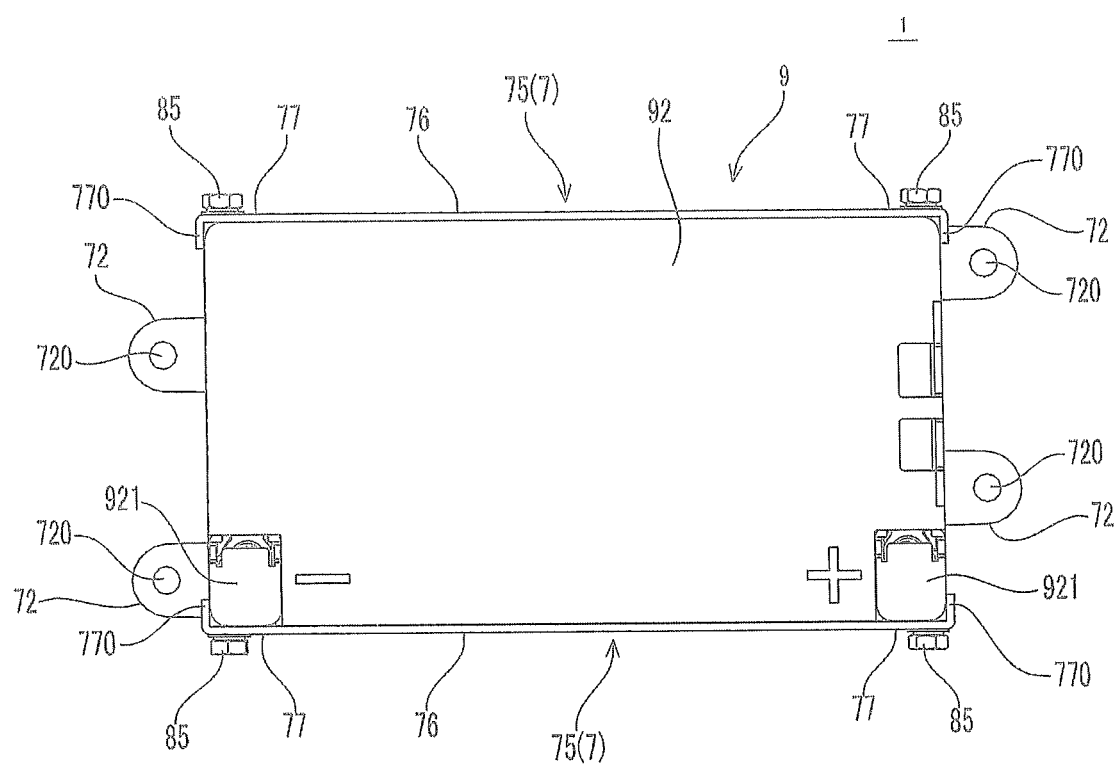
FIG. 4 is a plan view of the battery module.
Figure 5:
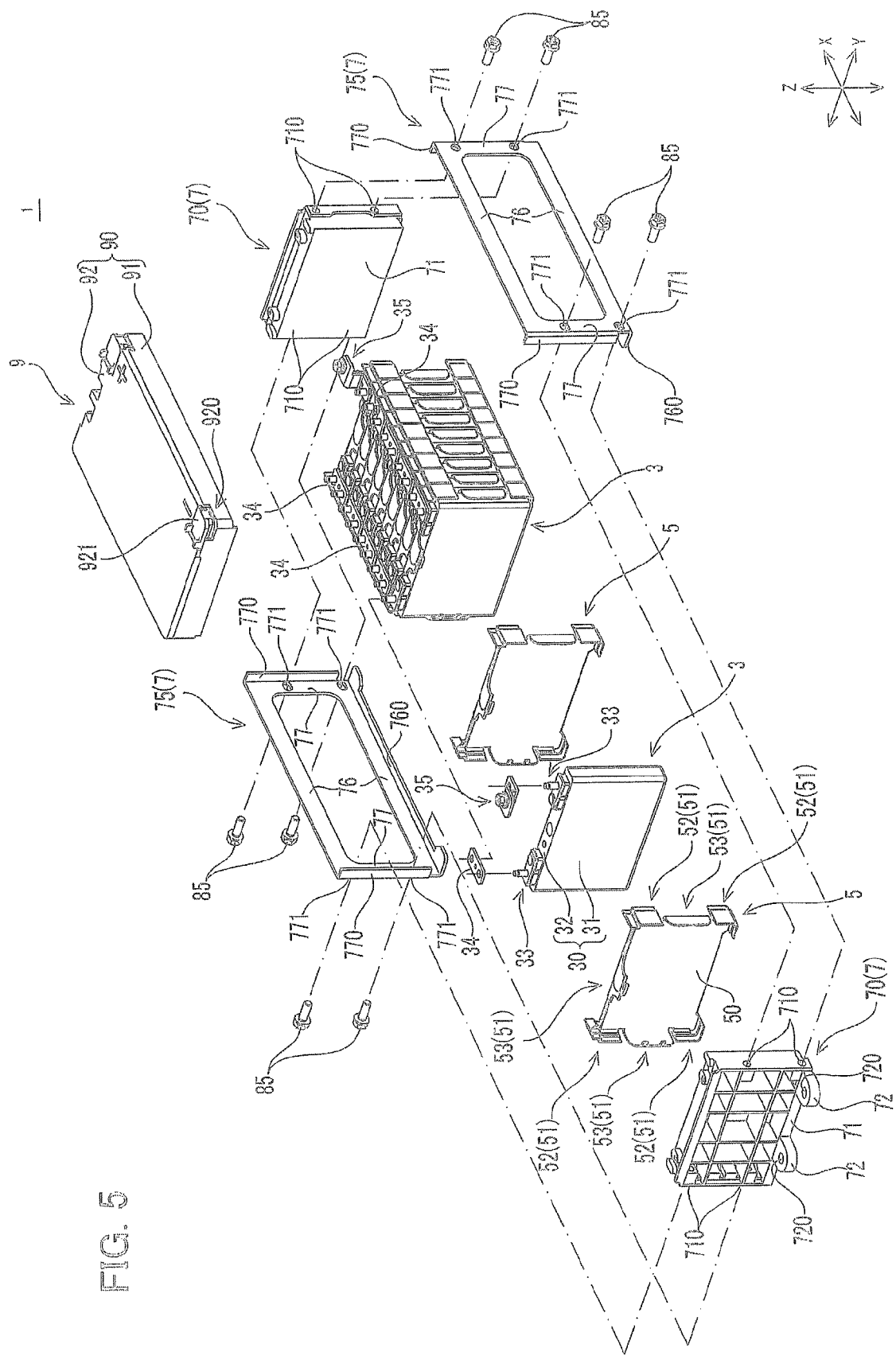
FIG. 5 is an exploded perspective view of the same battery module.

An electric storage apparatus according to an aspect of the present invention includes: a plurality of electric storage devices aligned in a first direction and each having an electrode terminal extending in a direction orthogonal to the first direction; a holding member configured to hold the plurality of electric storage devices; and a circuit case housing a circuit thereinside, wherein the holding member has an opening, and the circuit case is formed into a size corresponding to the opening so as to close the opening.

According to such a configuration, the circuit case is arranged in a direction orthogonal to the direction in which the electric storage apparatuses are aligned. That is, no circuit cases exist in the dimension in the alignment direction of the electric storage apparatuses. Therefore, it is possible to suitably prevent a reduction in electric storage capacity per unit volume due to there being the circuit cases with no electric storage capability, to which extent the space efficiency can be enhanced.

Further, the circuit is housed in the circuit case, and protected by the circuit case. Therefore, it is possible to suitably prevent operation failure or damage of the circuit from occurring due to foreign matter coming into contact with the circuit or accumulating thereon. Further, the circuit can be detached by disassembling the circuit case, which allows the circuit case to be reused, for example, when the circuit needs to be replaced due to damage or the like.

Furthermore, the opening of the holding member is covered by the circuit case. This makes it possible to suitably prevent foreign matter from entering through a gap between the holding member and the circuit case.

According to one aspect, the electric storage apparatus of the present invention may have a configuration in which the holding member includes a pair of end members sandwiching the plurality of electric storage devices in the first direction and a pair of coupling members coupling respective lateral parts of the pair of end members to each other, and the opening is defined by end edges, in a direction orthogonal to the first direction, of the pair of end members and the pair of coupling members.

According to such a configuration, the opening of the holding member defined by the end edges, in a direction orthogonal to the first direction, of the pair of end members and the pair of coupling members is covered by the circuit case. This makes it possible to suitably prevent foreign matter from entering through a gap between the holding member and the circuit case.

In this case, the electric storage apparatus may be configured to have a rectangular parallelepiped shape including: a first plane on which the circuit case is located, a second plane and a third plane, as a pair of parallel planes, on which the pair of end members are respectively located, a fourth plane and a fifth plane, as a pair of parallel planes, on which the pair of coupling members are respectively located, and a sixth plane on which a side opposite to the electrode terminals of the plurality of electric storage devices is located.

According to such a configuration, the electric storage apparatuses can be further closely arranged, and thus no space is wasted between adjacent electric storage apparatuses. Therefore, the space efficiency can be further enhanced.

Further, according to another aspect, the electric storage apparatus of the present invention may have a configuration in which the opening exposes the plane of the electrode terminals of the plurality of electric storage devices.

According to such a configuration, the opening of the holding member is covered by the circuit case. Therefore, the plane of the electrode terminals of the plurality of electric storage devices located inside the opening of the holding member is also covered by the circuit case. This makes it possible to suitably prevent foreign matter from entering through a gap between the holding member and the circuit case.

Further, according to still another aspect, the electric storage apparatus of the present invention may have a configuration in which the opening includes an extended portion extended from an end edge of the opening in a direction orthogonal to the first direction.

According to such a configuration, when the circuit case is placed on the holding member, the circuit case can be placed along the extended portion of the opening of the holding member. In this way, the extended portion functions as a guide means for placing the circuit case on the holding member.

Further, when the circuit case is placed on the holding member, transverse movement of the circuit case is restrained by the extended portion. In this way, the extended portion functions as a position regulating means, after the circuit case is placed on the holding member.

Further, the extended portion also exerts an effect of closing the gap between the holding member and the circuit case in a portion where the extended portion is formed. Therefore, it can prevent entry of foreign matter through such a portion.

In this case, the extended portion may be extended from a plurality of portions on the end edges of the opening.

According to such a configuration, when the circuit case is placed on the holding member, the circuit case can be inserted into a region, surrounded by the plurality of extended portions, of the opening of the holding member. In this way, the plurality of extended portions function as a guide means for placing the circuit case on the holding member.

Further, when the circuit case is placed on the holding member, transverse movement of the circuit case is restrained by the plurality of extended portions. In this way, the plurality of extended portions function as a position regulating means after the circuit case is placed on the holding member.

Further, according to still another aspect, the electric storage apparatus according to the present invention may be configured to include a spacer arranged between adjacent electric storage devices, wherein the spacer includes a spacer body and an extended portion extended from the spacer body into the circuit case, and the extended portion covers from the inside a boundary between the circuit case and the opening.

According to such a configuration, even if foreign matter penetrates through the boundary between the circuit case and the opening, the extended portions of the spacers can prevent further intrusion of the foreign matter.

As described above, the present invention can exert an excellent effect of enhancing the space efficiency by arranging the electric storage apparatuses as closely as possible.

Hereinafter, a battery module as one embodiment of the electric storage apparatus according to the present invention is described with reference to the drawings.

As shown in FIG. 1 to FIG. 5, a battery module 1 includes a plurality of battery cells 3 aligned in a first direction, a plurality of spacers 5 respectively arranged between adjacent battery cells 3 and on both sides in the first direction of the plurality of battery cells 3, a frame 7 as a holding member that holds the plurality of battery cells 3 and the plurality of spacers 5 so as to package them, and a cell monitoring circuit (CMU: Cell Monitor Unit) module 9 that monitors the plurality of battery cells 3 on a one-by-one basis of battery cells 3 for at least one of their voltage, current, and temperature.

In the following description, the first direction is referred to as an X direction (the direction of the X axis among orthogonal axes shown in the figures), and a second direction orthogonal to the first direction is referred to as a Y direction (the direction of the Y axis among orthogonal axes shown in the figures), and a third direction orthogonal to the first direction and the second direction is referred to as a Z direction (the direction of the Z axis among orthogonal axes shown in the figures), for convenience of description. In the figures, symbols X, Y, and Z are respectively indicated on one side of the X direction, the Y direction, and the Z direction. In the case where the Z direction is set in the vertical direction, the Z direction is the up-down direction, the Y direction is the left-right direction, and the X direction is the front-rear direction, in the figures.

The battery cells 3 each include a case 30 composed of a case body 31 having an opening and a cover plate 32 configured to close and seal the opening of the case body 31. The case 30 houses an electrode assembly (not shown in the figure) including a positive electrode plate and a negative electrode plate insulated from each other. The battery cell 3 is a rectangular battery cell flattened in the X direction.

The battery cell 3 includes a pair of positive and negative electrode terminals 33. Adjacent battery cells 3 are arranged so as to have opposite polarities to each other, and a bus bar 34 is attached to the electrode terminals 33 of the adjacent battery cells 3. From above them, nuts (not shown) are threadedly engaged to the electrode terminals 33. In this way, the plurality of battery cells 3 are electrically connected to one another, thereby forming one battery. A positive electrode external terminal 35 is attached to one electrode terminal (positive electrode terminal) 33 of one battery cell 3 (hereinafter, referred to as a "battery cell on one end") of two of the plurality of battery cells 3 that are located on both ends in the X direction, and a negative electrode external terminal 35 is attached to one electrode terminal (negative electrode terminal) 33 of the other of the two of the battery cells 3 (hereinafter, referred to as a "battery cell on the other end").

The spacers 5 are each made of a synthetic resin with insulating properties. The spacer 5 includes a spacer body 50 and a holding portion 51 extending from the spacer body 50 in the X direction and configured to hold the outer peripheral edges of the battery cell 3 that faces the spacer body 50 in the X direction. The spacer body 50 is formed into a rectangular shape corresponding to the rectangular shape, as seen in the X direction, of the case 30 of the battery cell 3. The holding portion 51 includes corner holding portions 52 formed respectively at four corners of the spacer body 50 and inter-corner holding portions 53 formed respectively at the center of three sides of the spacer body 50.

The battery module according to this embodiment employs, as a method for cooling the battery cells 3, a so-called water-cooling system in which the battery cells 3 are cooled by being in contact (for example, via a thermally conductive gel) with a cooling plate (heatsink) in which a cooling medium such as water circulates (via a pipe), but not a so-called air-cooling system in which the battery cells 3 are cooled by the air circulating through gaps formed between the battery cells 3. An air-cooled spacer uses a spacer body, for example, having a square-wave cross section in order to secure an air channel. However, a water-cooled spacer is free from such a requirement. Further, in order to mount a larger number of the battery cells 3 on a cooling plate by arranging the plurality of battery cells 3 as closely as possible, this embodiment employs the spacer body 50 in the form of a flat plate. Thus, the spacer 5 is arranged between adjacent battery cells 3 such that one surface in the X direction of the case 30 of one of the adjacent battery cells 3 abuts one surface of the spacer body 50, and one surface in the X direction of the case 30 of the other of the adjacent battery cells 3 abuts the other surface of the spacer body 50.

The frame 7 includes a pair of end members 70 (so-called end plates) arranged respectively on both sides in the X direction of the plurality of battery cells 3 so as to sandwich the plurality of battery cells 3 and the plurality of spacers 5 in the X direction, and coupling members 75 coupling the pair of end members 70 to each other so as to tighten the plurality of battery cells 3 and the plurality of spacers 5 into one.

The end members 70, for example, are each made of a metal such as aluminum and formed by casting. The end member 70 includes an end member body 71 and a leg portion 72 projecting outwardly from a lower part of the end member body 71 in the X direction. The end member body 71 is formed into a rectangular shape corresponding to the rectangular shape, as seen in the X direction, of the case 30 of the battery cell 3, in the same manner as the spacer body 50. The end member body 71 is composed of a rectangular frame portion and ribs in the form of a lattice formed within the frame portion. The end member body 71 is light in weight while having a moderate thickness in the X direction, thus having rigidity.

An internal thread 710 is formed along the Y direction on a lateral part of the end member body 71, into which a threaded portion of a bolt (fastener) 85, which will be described below, is screwed. A pair of internal threads 710 are provided in the Z direction at an interval from each other, on each of one lateral part and the other lateral part in the Y direction of the end member body 71 (hereinafter, referred to simply as "one lateral part" and "the other lateral part").

The pair of internal threads 710 in the one lateral part are formed at asymmetrical positions to each other with respect to the center line in the Z direction of the end member body 71. That is, one of the internal threads 710 is formed on one end side in the Z direction of the one lateral part, and the other of the internal threads 710 is formed at a position on the other end side thereof that is closer to the center in the Z direction of the one lateral part. More specifically, the one internal thread 710 is arranged on one end side in the Z direction of the one lateral part, and the other internal thread 710 is arranged in the one lateral part so that an interval larger than the width dimension in the Z direction of the head of the bolt 85 is formed between itself and the one internal thread 710, and an interval larger than the width dimension in the Z direction of the head of the bolt 85 is formed between itself and the other end in the Z direction of the one lateral part.

Further, the pair of internal threads 710 in the other lateral part are formed at asymmetrical positions to each other with respect to the center line in the Z direction of the end member body 71. That is, one of the internal threads 710 is formed on the other end side in the Z direction of the other lateral part, and the other of the internal threads 710 is formed at a position on one end side thereof that is closer to the center in the Z direction of the other lateral part. More specifically, one internal thread 710 is arranged on the other end side in the Z direction of the other lateral part, and the other internal thread 710 is arranged in the other lateral part so that an interval larger than the width dimension in the Z direction of the head of the bolt 85 is formed between itself and the one internal thread 710, and an interval larger than the width dimension in the Z direction of the head of the bolt 85 is formed between itself and the one end in the Z direction of the other lateral part.

Further, the pair of internal threads 710 in the one lateral part and the pair of internal threads 710 in the other lateral part are formed at symmetrical positions to each other with respect to the center point in the Y direction and the Z direction of the end member body 71.

The leg portion 72 is formed integrally with the end member body 71, while having a moderate thickness so as to have a sufficient strength against falling in the X direction and the Y direction in a state of being attached to a base plate A by a bolt (fastener) 87, which will be described below. The leg portion 72 has a through hole 720 formed along the Z direction for allowing the threaded portion of the bolt 87 to pass therethrough. The distal end of the leg portion 72 is formed into a semiarcuate shape. A pair of leg portions 72 are provided in the Y direction at an interval from each other.

The pair of leg portions 72 are formed at asymmetrical positions to each other with respect to the center line in the Y direction of the end member body 71. That is, one of the leg portions 72 is formed on one end side in the Y direction of the lower part of the end member body 71, and the other of the leg portions 72 is formed at a position on the other end side thereof that is closer to the center in the Y direction of the lower part of the end member body 71. More specifically, one leg portion 72 is arranged on one end side in the Y direction of the lower part of the end member body 71, and the other leg portion 72 is arranged so that an interval larger than the width dimension in the Y direction of the leg portion 72 is formed between itself and the one leg portion 72, and an interval larger than the width dimension in the Y direction of the leg portion 72 is formed between itself and the other end in the Y direction of the lower part of the end member body 71.

The same two end members 70 are used in this embodiment as the pair of end members 70. That is, the same two end members 70 aligned in the same direction are used in this embodiment with one of the two end members 70 being turned over 180 degree (rotated about the Z axis) so that their inner surfaces face each other.

It should be noted that the spacers 5 arranged between the end members 70 and the battery cells 3 are the same as the spacers 5 arranged between adjacent battery cells 3. Accordingly, the spacers 5 arranged between the end members 70 and the battery cells 3 are each arranged so that a surface in the X direction of the case 30 of the battery cell 3 abuts one surface of the spacer body 50, and the inner surface in the X direction of the end member 70 abuts the other surface of the spacer body 50.

A pair of the coupling members 75 are provided respectively on both sides in the Y direction of the plurality of battery cells 3. That is, one of the coupling members 75 is arranged facing the plurality of battery cells 3 on one side in the Y direction, and the other of the coupling members 75 is arranged facing the plurality of battery cells 3 on the other side in the Y direction.

The coupling members 75 each include a pair of transverse beams 76 extending along the X direction in parallel with an interval to each other, and a pair of longitudinal beams 77 respectively coupling one end portions to each other and the other end portions to each other in the X direction of the pair of transverse beams 76. The coupling member 75 as a whole is in the form of a rectangular frame. One of the pair of transverse beams 76 includes a folded portion 760 extending around the bottom portions of the plurality of battery cells 3. The pair of longitudinal beams 77 include folded portions 770 respectively extending around the surfaces at one end and the other end in the X direction of the battery cells 3.

These folded portions 760 and 770 increase the rigidity of the pair of coupling members 75, in addition to which the folded portion 760 restrains the plurality of battery cells 3 and the plurality of spacers 5 in the Z direction, the pair of folded portions 770 restrain them in the X direction, and the pair of transverse beams 76 and the pair of longitudinal beams 77 restrain them in the Y direction. Further, the coupling member 75 is formed of the pair of transverse beams 76 and the pair of longitudinal beams 77 so as to have a frame shape, so that its cross-sectional moment particularly in the X direction is improved, thereby having a significantly increased rigidity in the stacking direction of the plurality of battery cells 3.

A through hole 771 which allows the threaded portion of the bolt 85 to pass therethrough is formed in the Y direction in each of the pair of longitudinal beams 77 of the coupling member 75. A pair of through holes 771 are provided at an interval in the Z direction in each of one end portion and the other end portion in the X direction of the coupling member 75 (hereinafter, referred to simply as "one end portion" and "the other end portion", respectively).

The pair of through holes 771 in the one end portion are formed at asymmetrical positions to each other with respect to the center line in the Z direction of the coupling member 75. That is, one of the through holes 771 is formed on one end side in the Z direction of the one end portion, and the other of the through holes 771 is formed at a position on the other end side thereof that is closer to the center in the Z direction of the one end portion. More specifically, the one through hole 771 is arranged on one end side in the Z direction of the one end portion, and the other through hole 771 is arranged in the one end portion so that an interval larger than the width dimension in the Z direction of the head of the bolt 85 is formed between itself and the one through hole 771, and an interval larger than the width dimension in the Z direction of the head of the bolt 85 is formed between itself and the other end in the Z direction of the one end portion.

Further, the pair of through holes 771 in the other end portion are formed at asymmetrical positions to each other with respect to the center line in the Z direction of the coupling member 75. That is, the one through hole 771 is formed on the other end side in the Z direction of the other end portion, and the other through hole 771 is formed at a position on one end side thereof that is closer to the center in the Z direction of the other end portion. More specifically, the one through hole 771 is arranged on the other end side in the Z direction of the other end portion, and the other through hole 771 is arranged in the other end portion so that an interval larger than the width dimension in the Z direction of the head of the bolt 85 is formed between itself and the one through hole 771, and an interval larger than the width dimension in the Z direction of the head of the bolt 85 is formed between itself and the one end in the Z direction of the other end portion.

Further, the pair of through holes 771 in the one end portion are formed at symmetrical positions to the pair of through holes 771 in the other end portion with respect to the center point in the Y direction and the Z direction of the coupling member 75.

The same two coupling members 75 are used in this embodiment as the pair of coupling members 75. That is, the same two coupling members 75 aligned in the same direction are used in this embodiment with one of the two coupling members 75 being turned over 180 degree (rotated about the Z axis) so that their inner surfaces face each other.

The cell monitoring circuit module 9 is a cell monitoring circuit (not shown) housed in a circuit case 90. The circuit case 90 includes a case body 91 having an opening, and a cover plate 92 configured to close and seal the opening of the case body 91.

Figure 6:
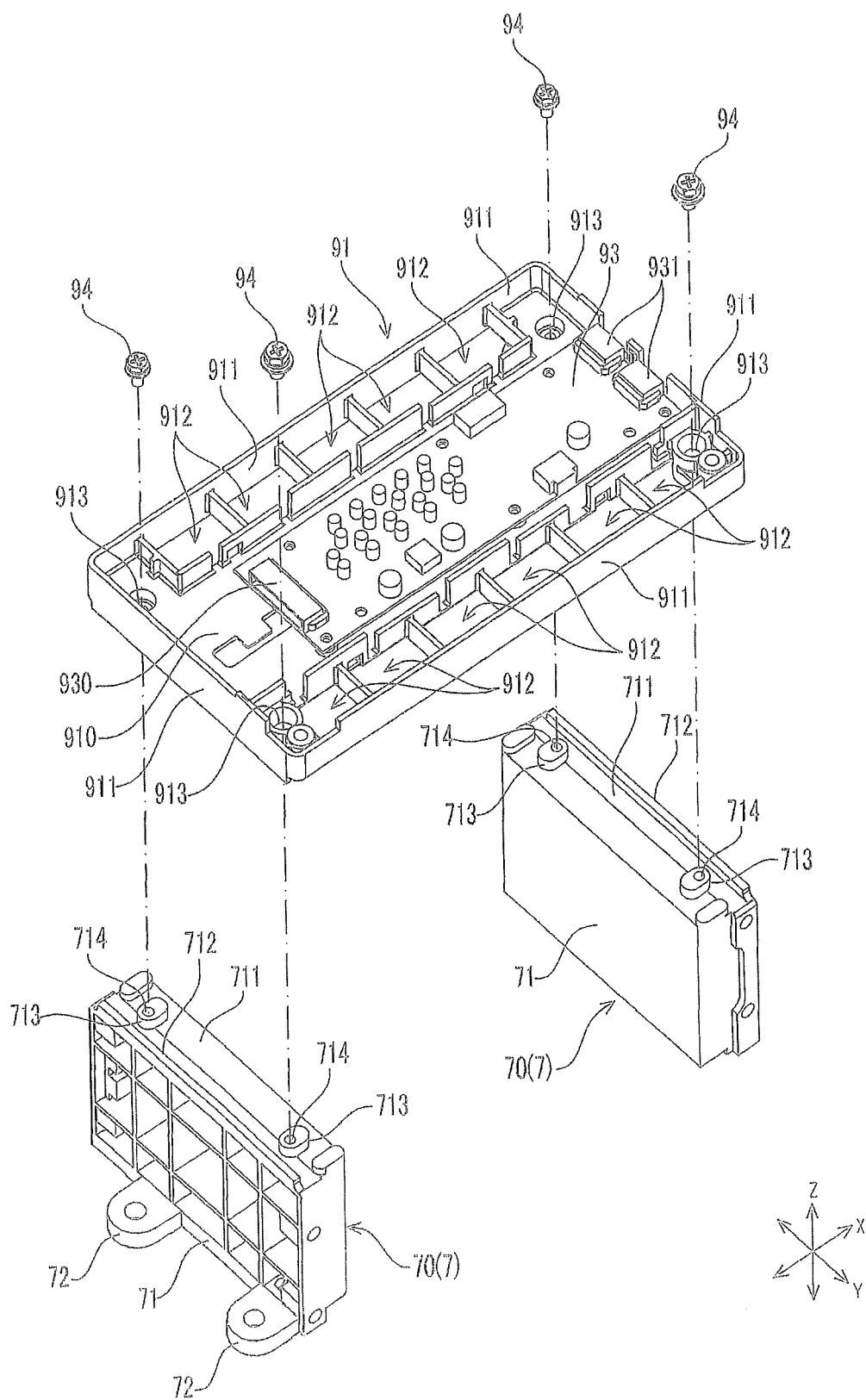
FIG. 6 is an exploded perspective view of a cell monitoring circuit module and end members of the frame of the battery module.
Figure 7:
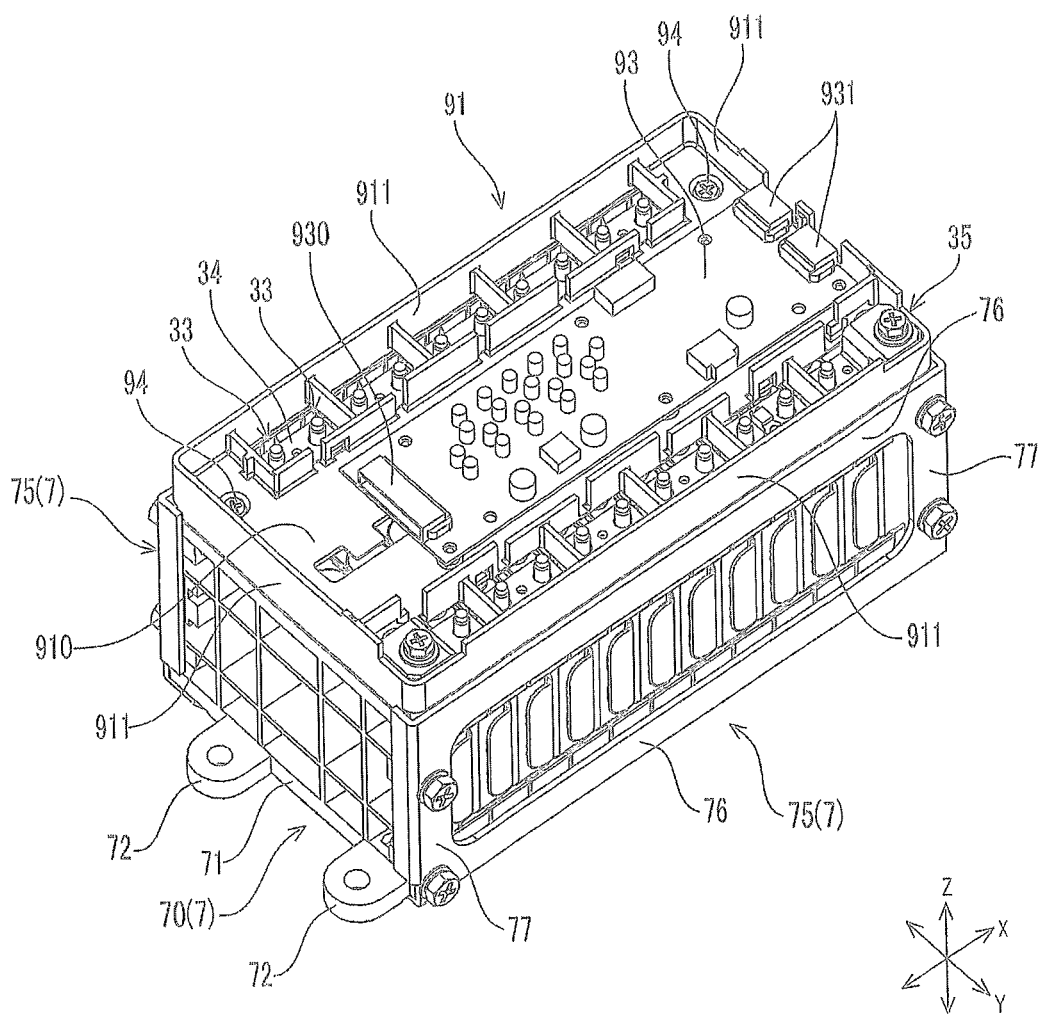
FIG. 7 is a perspective view of the battery module from which a cover plate of the cell monitoring circuit module is detached.

As shown in FIG. 6 and FIG. 7, the case body 91 includes a bottom plate 910 and peripheral walls 911 erected from the peripheral edges of the bottom plate 910. The case body 91 is formed into a rectangular shape corresponding to the rectangular shape, as seen in the Z direction, of the opening of the frame 7 formed in the Z direction. More specifically, the case body 91 is formed into a rectangular shape that is elongated in the X direction corresponding to the elongated rectangular shape, as seen in the Z direction, of the opening of the frame 7 formed in the Z direction. The length of the long side (length in the X direction) of the case body 91 is the same or substantially the same as the distance between the outer surfaces in the X direction of the pair of end members 70. Accordingly, the outer surfaces of the peripheral walls 911 in the X direction of the case body 91 are flush or substantially flush respectively with the outer surfaces of the end members 70. Further, the length of the short side (length in the Y direction) of the case body 91 is the same or substantially the same as a total of the width (length in the Y direction) of the battery cell 3 and the thickness of a pair of corner holding portions 52 of the spacer 5 located in the Y direction. Accordingly, the outer surfaces of the peripheral walls 911 in the Y direction of the case body 91 are flush or substantially flush respectively with the outer surfaces in the Y direction of the corner holding portions 52 of the spacer 5.

Figure 8A:
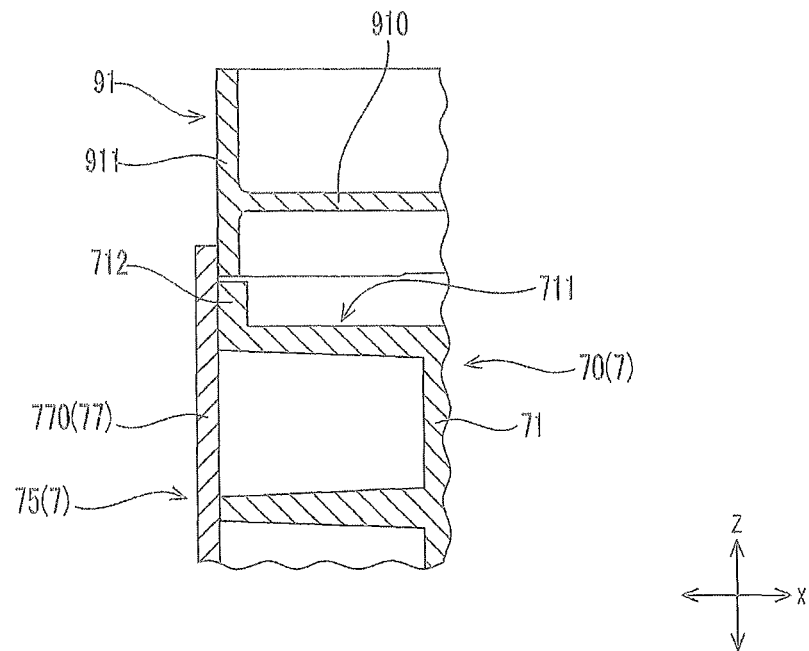
FIG. 8A is an enlarged sectional view along the XZ plane of a main part of a joint portion between one of the end members of the frame and a case body of the cell monitoring circuit module.
Figure 8B:
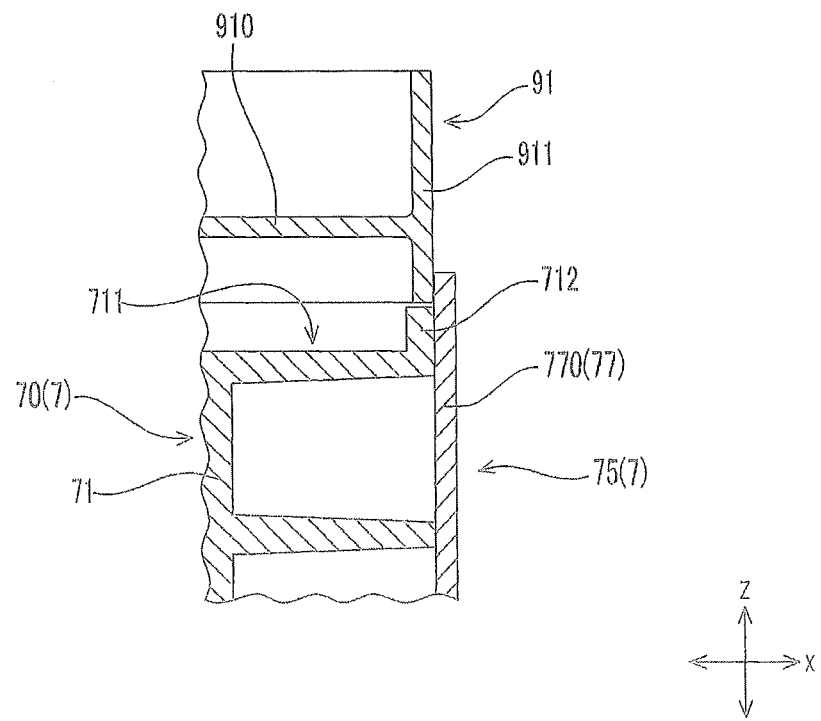
FIG. 8B is an enlarged sectional view along the XZ plane of a main part of a joint portion between the other of the end members of the frame and the case body of the cell monitoring circuit module.

Here, as shown in FIG. 6 and FIG. 8, a projecting ridge 712 is formed on the top portion 711 in the Z direction of the end member body 71 of the end member 70. The projecting ridge 712 has a specific width in the X direction, and is formed extending along the Y direction from one end to the other end in the Y direction of the end member body 71. The projecting ridge 712 is formed flush with the outer surface in the X direction of the end member body 71 at a position corresponding to a peripheral wall 911 of the case body 91. Accordingly, when the case body 91 is placed on the pair of end members 70, the projecting ridge 712 and the peripheral wall 911 of the case body 91 are brought into abutting contact or close contact with each other, with substantially no gap formed therebetween.

It should be noted that at least corners of the case body 91 project toward the end member 70. Further, the opening of the frame 7 includes extended portions (not numbered) extended in the Z direction along end edges of the opening.

A more specific description is given below. The longitudinal beams 77 and their folded portions 770 of the coupling member 75 are extended in the Z direction from the end member 70. More specifically, the longitudinal beams 77 and their folded portions 770 of the coupling member 75 project in the Z direction over the projecting portions of the end members 70. That is, the portions of the folded portions 770 that protrude over the end members 70 in the Z direction are extended portions of the frame 7 (extended portions of the frame opening 7).

When the case body 91 is placed on the pair of end members 70, four corners of the case body 91 are brought into a state of being surrounded by the longitudinal beams 77 and their folded portions 770 of the coupling members 75 from the outside in the X direction and in the Y direction. Therefore, when the case body 91 is placed on the pair of end members 70, the case body 91 is restrained from unnecessarily moving on planes that are orthogonal to each other in the X direction and the Y direction.

Figure 9A:
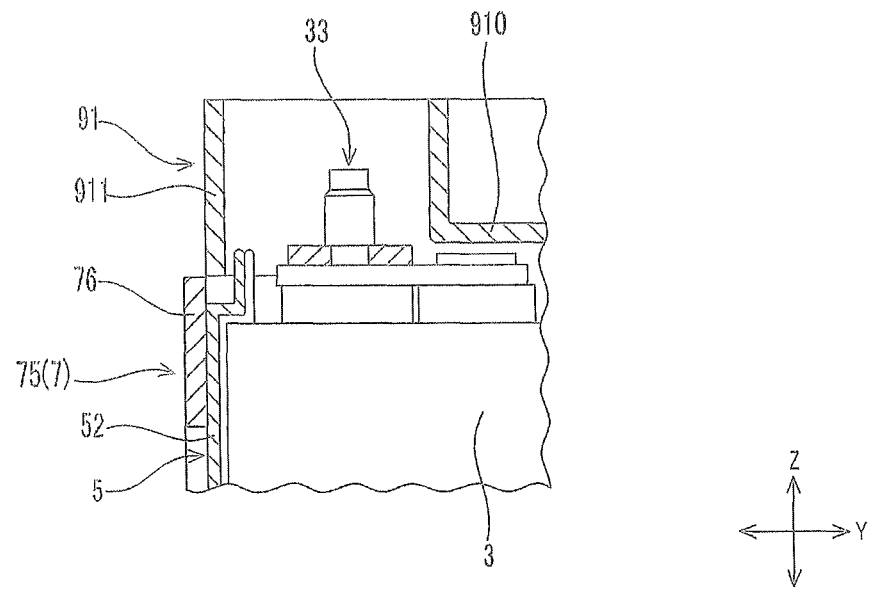
FIG. 9A is an enlarged sectional view along the YZ plane of a main part of a joint portion between one of coupling members of the frame and the case body of the cell monitoring circuit module.
Figure 9B:
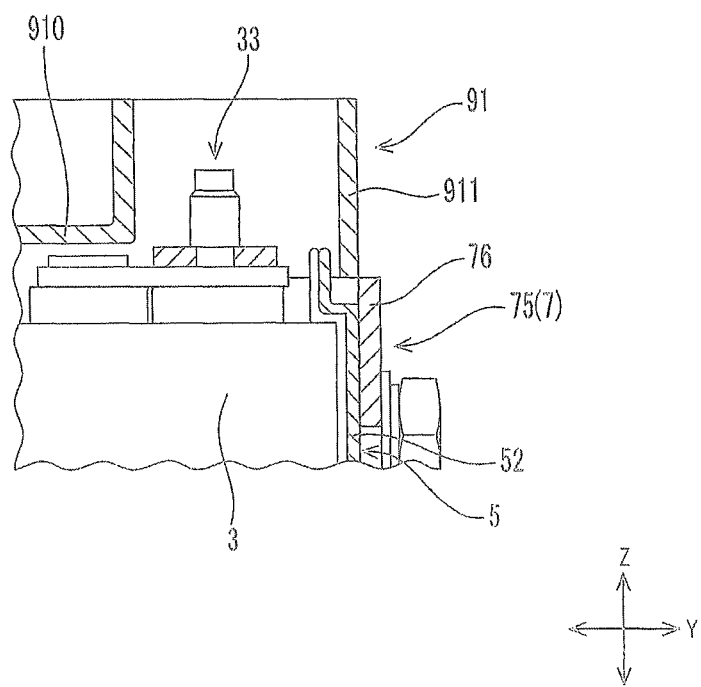
FIG. 9B is an enlarged sectional view along the YZ plane of a main part of a joint portion between the other of the coupling members of the frame and the case body of the cell monitoring circuit module.

Further, when the case body 91 is placed on the pair of end members 70, the transverse beams 76 of the coupling members 75 and the peripheral walls 911 of the case body 91 are brought into abutting contact or close contact with each other (though they are shifted from each other in the Y direction), with substantially no gap formed therebetween in the Y direction, as shown in FIGS. 9A and 9B.

It should be noted that the corner holding portions 52 of the spacer 5 project in the Z direction over the transverse beams 76 of the coupling members 75. Accordingly, when the case body 91 is placed on the pair of end members 70, the corner holding portions 52 of the spacer 5 are extended into the case body 91, while being brought into close contact with the inner surfaces of the peripheral walls 911. That is, the corner holding portions 52 as extended portions extended from the spacer body 50 function as members covering the boundary between the transverse beams 76 of the coupling members 75 and the peripheral walls 911 of the case body 91 from the inside.

Returning to FIG. 6 and FIG. 7, the case body 91 includes a plurality of openings 912 provided in the X direction along the end edges in the Y direction of the bottom plate 910. The openings 912 are configured to allow the electrode terminals 33 of the plurality of battery cells 3 to protrude into the case body 91. The openings 912 are each formed, corresponding to the electrode terminals 33 of adjacent battery cells 3, that is, so as to be capable of housing two electrode terminals 33 of adjacent battery cells 3. Further, the opening 912 is formed to have a size capable of housing the bus bar 34.

A cell monitoring circuit 93 is arranged at the center in the Y direction of the bottom plate 910 of the case body 91, that is, between the rows of the openings 912 that are aligned in two rows with an interval therebetween in the Y direction. The cell monitoring circuit 93 includes an input connector 930 and an output connector 931. An output connector (not shown) formed at one end of a harness (not shown) composed of a plurality of harness wires bound together is coupled to the input connector 930. The harness wires each have a connection terminal (not shown) at the other end. The connection terminal is connected to the electrode terminal 33 of the battery cell 3 or the bus bar 34. An input connector (not shown) of a harness (not shown) to be connected to a battery monitoring circuit (BMU: Battery Management Unit, not shown) is coupled to the output connector 931. It should be noted that the output connector 931 is required to be open to the outside of the circuit case 90 in order to allow the input connector to be coupled thereto from the outside of the circuit case 90. Therefore, portions on the peripheral walls 911 of the case body 91 that correspond to the output connector 931 are cut away so as to be open.

Here, a support post 713 is formed projecting in the Z direction on the top portion 711 of the end member 70. The support post 713 is formed at each of both ends of the top portion 711 of the end member 70. The support post 713 is provided so as to receive the case body 91 (specifically, the bottom plate 910) when the case body 91 is placed on the pair of end members 70. The support post 713 has an internal thread 714, extending in the Z direction, into which the threaded portion of a bolt (fastener) 94 is screwed. On the other hand, a through hole 913, extending in the Z direction, configured to allow the threaded portion of the bolt 94 to pass therethrough is formed at a point, corresponding to the support post 713, on the bottom plate 910 of the case body 91. Then, the threaded portion of the bolt 94 that has been inserted through the through hole 913 of the case body 91 is screwed into the internal thread 714 of the end member 70. Thereby, the cell monitoring circuit module 9 is attached and fixed to the frame 7.

The cover plate 92 is detachably fitted to the opening defined by the peripheral walls 911 of the case body 91 in the Z direction so as to close the opening. It should be noted that, as shown in FIG. 1 to FIG. 5, the cover plate 92 includes openings 920 that allow the external terminals 35 to be exposed in portions facing a pair of external terminals 35, and caps 921 that openably close the respective openings 920 so that the external terminals 35 are usually not exposed.

The battery module 1 configured as above is accomplished as follows: the plurality of battery cells 3 are stacked with the spacers 5 interposed therebetween; the spacers 5 are also arranged laterally of the battery cells 3 respectively at one end and the other end; the pair of end members 70 are further arranged respectively on both sides thereof; while a compressive force in the X direction is applied between the pair of end members 70, the pair of coupling members 75 are arranged on the plurality of battery cells 3 in the Y direction, and the threaded portions of the bolts 85 inserted through the respective through holes 771 of the coupling members 75 are screwed into the internal threads 710 of the end members 70; and, after the plurality of battery cells 3 and the plurality of spacers 5 are integrated with the frame 7, the cell monitoring circuit module 9 is arranged on the plurality of battery cells 3 in the Z direction so as to be attached thereto.

Further, the battery module 1 configured as above has the cell monitoring circuit module 9 arranged in a direction orthogonal to the direction in which battery modules 1 are aligned. That is, no cell monitoring circuit modules 9 exist in the dimension in the alignment direction of the battery modules 1. Therefore, it is possible to suitably prevent a reduction in electric storage capacity per unit volume due to there being the cell monitoring circuit modules 9 with no electric storage capability, to which extent the space efficiency can be enhanced.

Further, the battery module 1 configured as above has the cell monitoring circuit 93 housed in the circuit case 90 so as to be protected by the circuit case 90. Therefore, it is possible to suitably prevent operation failure or damage of the cell monitoring circuit 93 from occurring due to foreign matter coming into contact with the circuit or accumulating thereon. Further, the cell monitoring circuit 93 can be detached by disassembling the circuit case 90, which allows the circuit case 90 to be reused, for example, when the cell monitoring circuit 93 needs to be replaced due to damage or the like.

Further, in the battery module 1 configured as above, when the cell monitoring circuit module 9 is placed on the frame 7, the outer circumference of the circuit case 90 of the cell monitoring circuit module 9 overlaps the end edges of the opening formed in the Z direction of the frame 7 (the projecting ridges 712 on the top portions 711 of the pair of end members 70 in the X direction of the frame 7 and the longitudinal beams 77 of the pair of coupling members 75 in the Y direction of the frame 7). That is, the opening of the frame 7 is covered by the circuit case 90, and therefore the plane of the electrode terminals 33 of the plurality of battery cells 3 located inside the opening of the frame 7 is covered by the circuit case 90. This can suitably prevent accidents such as that foreign matter that has entered through the gap between the frame 7 and the cell monitoring circuit module 9 strides across the case 30 of the battery cell 3 and the electrode terminal 33, thereby causing a short circuit. That is, the circuit case 90 functions as a cover plate closing the opening of the frame 7. Thus, the need to separately provide a cover plate can be eliminated, which allows a reduction in the number of components.

Particularly, when the cell monitoring circuit module 9 is placed on the frame 7, the four corners of the circuit case 90 of the cell monitoring circuit module 9 are surrounded, from the outside in the X direction and the Y direction, respectively by the end edges of portions (corners) along the opening of the frame 7 (the longitudinal beams 77 of the pair of coupling members 75 in the Y direction of the frame 7 and their folded portions 770). Therefore, in such portions, a higher effect of preventing entry of foreign matter can be expected.

Further, the corner holding portions 52 of the spacers 5 cover the boundary between the transverse beams 76 of the coupling members 75 and the peripheral walls 911 of the case body 91 from the inside, as has been mentioned above (see FIG. 9). Therefore, even if foreign matter penetrates between the transverse beams 76 and the peripheral walls 911, the corner holding portions 52 can prevent further intrusion of the foreign matter.

Meanwhile, in battery modules of a so-called stack type in which a plurality of battery cells aligned in a row are tightened together and retained by a frame including a pair of end members and coupling members coupling the pair of end members to each other, a pressure is generally applied to the battery cells, and therefore it is highly possible that the distance between adjacent battery cells is reduced. Therefore, if a structure to cover the plurality of battery cells is provided in advance, the dimension of such a structure may mismatch the distance between the pair of end members when the frame is assembled, in some cases. As a result, there is a possibility of breakage of the structure by being sandwiched between the pair of end members. On the other hand, it is also conceivable to increase the area of components of the frame (for example, coupling members) so as to cover the plurality of battery cells, which however results in an increase in weight and cost. Accordingly, in the case of a battery module of the stack type, after the battery cells 3 are tightened together (restrained) by the frame 7, the plurality of battery cells 3 is covered by a separate structure other than the frame 7, as in the battery module 1 with the above-mentioned configuration, which makes it possible to more suitably prevent the entry of foreign matter into the battery cells 3.

It is possible to prevent entry of foreign matter from the outside by housing such a battery module of the stack type within a battery pack. However, the battery module 1 configured as above can enhance the space efficiency because it eliminates the need to separately provide such a battery pack.

Further, in the battery module 1 configured as above, when the cell monitoring circuit module 9 is placed on the frame 7, the circuit case 90 of the cell monitoring circuit module 9 is not in contact with the battery cells 3. Therefore, even if the battery cells 3 generate heat, the heat is unlikely to be transferred to the circuit case 90 and the cell monitoring circuit 93 thereinside. This can suitably prevent the cell monitoring circuit 93 from being damaged by the heat or defects such as malfunction from occurring due to the influence of the heat. Moreover, in order to deal with internal pressure abnormality in the case 30 of the battery cells 3, a safety valve that splits open to release the internal pressure of the case 30 is usually provided in the case 30 (mostly, in the cover plate 32 serving as the plane of the electrode terminals 33). However, the battery module 1 configured as above has the circuit case 90 that is not in contact with the battery cells 3 (on the side of the plane of the electrode terminals 33) at a distance therefrom. Therefore, the circuit case 90 does not prevent gas ventilation.

Further, in the battery module 1 configured as above, when the cell monitoring circuit module 9 is placed on the frame 7, the corners of the case body 91 of the cell monitoring circuit module 9 are restrained from unnecessarily moving on planes that are orthogonal to each other in the X direction and the Y direction by the end edges of portions (corners) along the opening of the frame 7 (the longitudinal beams 77 of the pair of coupling members 75 in the Y direction of the frame 7 and their folded portions 770). This can suitably prevent positional deviation of the cell monitoring circuit module 9 assembled to the frame 7 due to a strong external force applied thereto.

Furthermore, when the cell monitoring circuit module 9 is placed on the frame 7, the case body 91 may be inserted into the end edges of portions (corners) along the opening of the frame 7. This allows easy positioning of the case body 91 to the frame 7. That is, the end edges of portions (corners) along the opening of the frame 7 function as a guide to place the case body 91 on the frame 7, and also as a position regulating means after the case body 91 is placed on the frame 7.

Further, the battery module 1 configured as above has a hexahedral shape (rectangular parallelepiped shape) including a first plane on which the cell monitoring circuit module 9 is located, a second plane and a third plane, as a pair of parallel planes, on which the pair of end members 70 of the frame 7 are respectively located, a fourth plane and a fifth plane, as a pair of parallel planes, on which the pair of coupling members 75 of the frame 7 are respectively located, and a sixth plane on which the bottom parts of the plurality of battery cells 3 are located. That is, the battery module 1 configured as above is partially free from unnegligible or substantial projections, except for the leg portions 72 and the heads of the bolts 85. Moreover, the leg portions 72 of one of adjacent battery modules 1 in the X direction and the leg portions 72 of the other of the battery modules 1 are located at different positions in the Y direction. Therefore, the leg portions 72 do not interfere with each other. Further, the heads of the bolts 85 of the one of the adjacent battery modules 1 in the Y direction and the heads of the bolts 85 of the other of the battery modules 1 are located at different positions in the Z direction, and thus the heads of the bolts 85 interfere with each other. This enables close arrangement of the battery modules 1 in both the longitudinal direction and the lateral direction. In this way, while the electric storage capacity per unit volume is increased, the size of the battery module unit can be reduced.

It should be noted that the electric storage apparatus according to the present invention is not limited to the above-mentioned embodiment, and various modifications can be made without departing from the gist of the invention.

For example, another opening of the frame 7 formed in the Z direction, that is, the opening from which the bottoms of the plurality of battery cells 3 are exposed is not particularly mentioned in the above-mentioned embodiment. However, this opening may be closed by another cell monitoring circuit module 9 or another cover. In the case where a plurality of battery modules 1 are aligned transversely, longitudinally, or in an array in both the longitudinal and lateral directions, these battery modules are mounted on a base plate. The base plate may be a cooling plate (heatsink) in which a cooling medium such as water circulates (via a pipe).

Further, in the above-mentioned embodiment, one cell monitoring circuit module 9 is provided for one battery module 1. However, this is not restrictive. A plurality of cell monitoring circuit modules may be provided for a single battery module, for example, by arranging two cell monitoring circuit modules that are aligned in the X direction or in the Y direction within the battery module. Specifically, two cell monitoring circuit modules each having a size equivalent to the size of one piece of the cell monitoring circuit module 9 of the above-mentioned embodiment divided in the X direction, for example, into two may be aligned in the X direction, or two cell monitoring circuit modules each having a size equivalent to the size of one piece of the cell monitoring circuit module 9 of the above-mentioned embodiment divided in the Y direction, for example, into two may be aligned in the Y direction.

Further, the cell monitoring circuit module 9 has been described in the above-mentioned embodiment. However, circuit modules of the present invention are not limited to the cell monitoring circuit module 9, and also includes circuit modules other than the cell monitoring circuit module 9.

Further, the circuit case 90 is separated from the cell monitoring circuit module 9 in the above-mentioned embodiment. However, this is not restrictive. The circuit case 90 may be molded to include the cell monitoring circuit 93 by the in-mold process, without being separated therefrom. However, the circuit case 90 is preferably separated, as described above, in that the cell monitoring circuit 93 can be separately replaced.

Further, the frame 7 including the pair of end members 70 and the pair of coupling members 75 is used as a holding member and the stacked battery cells 3 are tightened together and retained by the frame 7 in the above-mentioned embodiment. However, this is not restrictive. The holding member, for example, may be a housing in the form of a case (or a box) configured to house the plurality of battery cells 3 that are closely arranged therein or arranged with some gaps between themselves.

Further, in the above-mentioned embodiment, the corner holding portions 52 of the spacers 5 cover the boundary between the transverse beams 76 of the coupling members 75 and the peripheral walls 911 of the case body 91 from the inside. Therefore, even if foreign matter penetrates between the transverse beams 76 and the peripheral walls 911, the corner holding portions 52 can prevent further intrusion of the foreign matter, as mentioned above. However, this is not restrictive. For example, it is sure that the corner holding portions 52 of all the spacers 5 preferably cover the boundary between the transverse beams 76 of the coupling members 75 and the peripheral walls 911 of the case body 91 from the inside, which however is not essential. Only the corner holding portions 52 of some of the spacers 5 may be configured to cover the boundary between the transverse beams 76 of the coupling members 75 and the peripheral walls 911 of the case body 91 from the inside.

Further, lithium ion secondary battery cells are described in the above embodiment. However, the types and size (capacity) of the battery cells are arbitrarily selected.

Further, the present invention is not limited to such a lithium ion secondary battery cell. The present invention can be applied to various secondary battery cells, and further to primary battery cells or capacitors such as an electric double layer capacitor.

What is claimed is:

1. An electric storage apparatus, comprising:
   a plurality of electric storage devices aligned in a first direction and each including an electrode terminal extending in a direction orthogonal to the first direction;
   a holding member including a pair of end members sandwiching the plurality of electric storage devices in the first direction, and a pair of coupling members coupling lateral parts of the pair of end members to each other;
   a circuit case housing a circuit thereinside,
      wherein the holding member includes an opening that is defined by end edges, in a direction orthogonal to the first direction of the pair of end members and the pair of coupling members,
      wherein the circuit case is formed into a size corresponding to the opening so as to close the opening,
      wherein edges of the pair of coupling members extend along the first direction in a straight line and in parallel with a predetermined distance to each other,
      wherein the pair of end members comprises internal threads for receiving a screw fastener,
      wherein the circuit a is fixed on a top of the pair of end members by the screw fastener, and
      wherein an outer circumference of the circuit case overlaps with the end edges of the opening; and
   a pair of support posts projecting, in the direction orthogonal to the first direction of the pair of end members and the pair of coupling members, from the top of each of the pair of end members.

2. The electric storage apparatus according to claim 1, wherein the electric storage apparatus has a rectangular parallelepiped shape including:
- a first plane on which the circuit case is located;
- a second plane, and a third plane, as a pair of parallel planes, on which the pair of end members are respectively located;
- a fourth plane and a fifth plane, as a pair of parallel planes, on which the pair of coupling members are respectively located; and
- a sixth plane on which a side opposite to the electrode terminals of the plurality of electric storage devices is located.

3. The electric storage apparatus according to claim 1, wherein the opening exposes a plane of the electrode terminals of the plurality of electric storage devices.

4. The electric storage apparatus according to claim 1, wherein the opening includes an extended portion extended from the end edges of the opening in the direction orthogonal to the first direction.

5. The electric storage apparatus according to claim 4, wherein the extended portion is extended from each of a plurality of points on the end edges of the opening.

6. The electric storage apparatus according to claim 1, further comprising:
- a spacer arranged between adjacent two of the electric storage devices,
- wherein the spacer includes a spacer body and an extended portion extended from the spacer body into the circuit case, and
- wherein the extended portion covers a boundary between the circuit case and the opening from an inside.

7. The electric storage apparatus according to claim 1, wherein corners of the circuit case are surrounded by the end edges of the opening.

8. The electric storage apparatus according to claim 1, wherein each of the support posts includes the internal threads, extending in the direction orthogonal to the first direction of the pair of end members and the pair of coupling members, into which a threaded portion of the screw fastener is screwed.

9. The electric storage apparatus according to claim 8, further comprising:
- a through hole, extending in the direction orthogonal to the first direction of the pair of end members and the pair of coupling members, configured to allow the threaded portion of the screw fastener to pass therethrough.

10. The electric storage apparatus according to claim 9, wherein the through hole is provided at a point, corresponding to said each of the support posts, on a bottom plate of the circuit case.

11. An electric storage apparatus, comprising:
- a plurality of electric storage devices aligned in a first direction;
- a holding member including:
  - a pair of end members each extending in a second direction orthogonal to the first direction, the pair of end members sandwiching the plurality of electric storage devices in the first direction; and
  - a pair of coupling members each extending in the first direction and coupling the pair of end members to each other;
- a circuit case housing a circuit,
  - wherein the holding member includes an opening that is defined by end edges extending in a third direction orthogonal to the first direction and the second direction,
  - wherein edges of the pair of coupling members extend along the first direction in a straight line and in parallel with a predetermined distance to each other,
  - wherein the pair of end members comprises internal threads for receiving a screw fastener,
  - wherein the circuit case is attached to a top surface of the pair of end members by the screw fastener, and
  - wherein an outer circumference of the circuit case overlaps with the end edges of the opening; and
- a pair of support posts projecting, in the third direction from the top surface of the pair of end members.

12. The electric storage apparatus according to claim 11, further comprising:
- a spacer arranged between adjacent two of the electric storage devices,
- wherein the spacer includes a spacer body and an extended portion extended from the spacer body into the circuit case, and
- wherein the extended portion covers a boundary between the circuit case and the opening from an inside.

13. The electric storage apparatus according to claim 11, wherein corners of the circuit case are surrounded by the end edges of the opening.

14. The electric storage apparatus according to claim 11, wherein each of the support posts includes the internal threads, extending in the third direction, into which a threaded portion of the screw fastener is screwed.

15. The electric storage apparatus according to claim 14, further comprising:
- a through hole, extending in the third direction, configured to allow the threaded portion of the screw fastener to pass therethrough.

16. The electric storage apparatus according to claim 15, wherein the through hole is provided at a point, corresponding to said each of the support posts, on a bottom plate of the circuit case.

17. The electric storage apparatus according to claim 11, wherein the opening exposes a plane of electrode terminals of the plurality of electric storage devices.

* * * * *